Patented Dec. 19, 1939

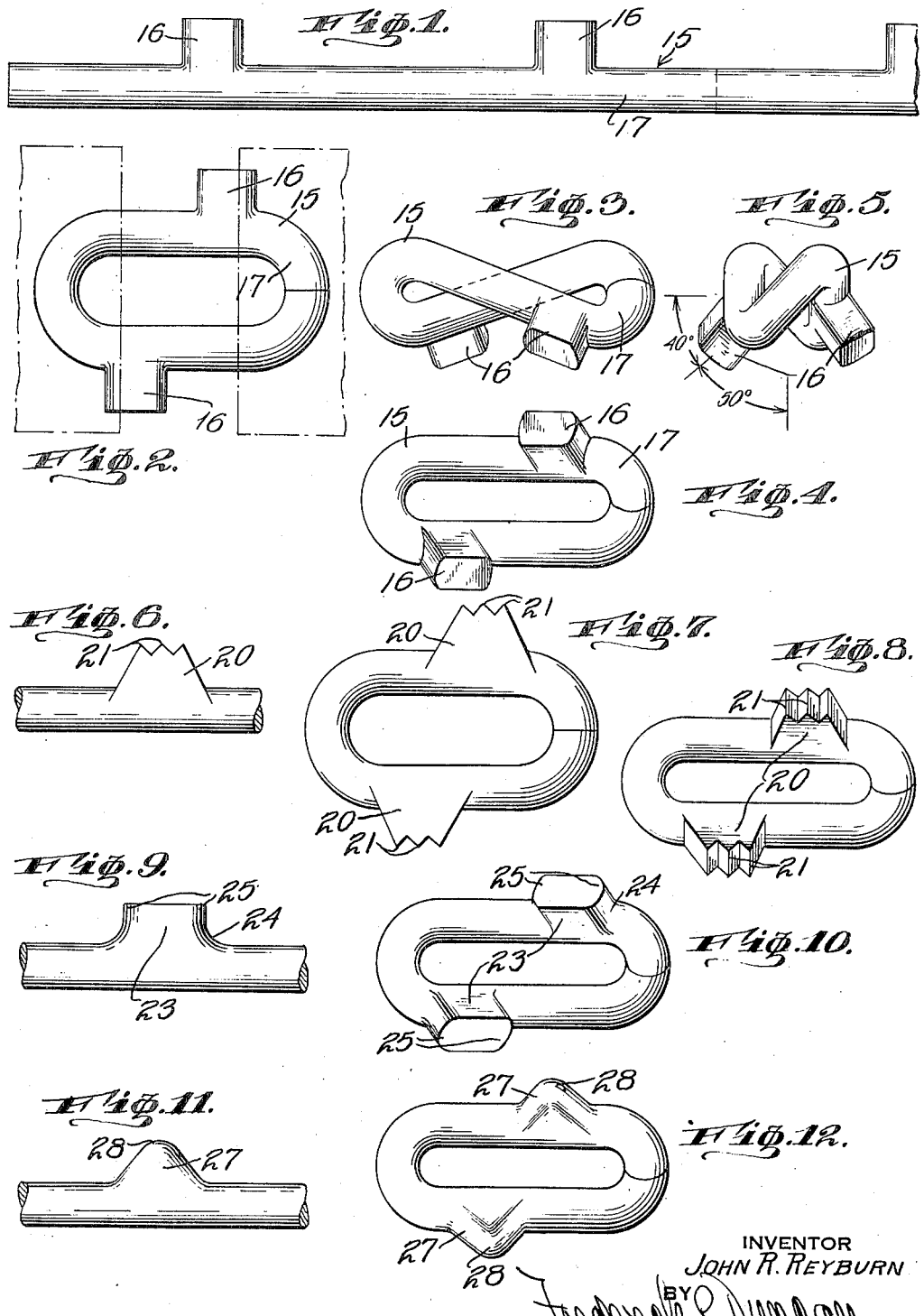

2,184,127

UNITED STATES PATENT OFFICE 2,184,127

METHOD OF MAKING ANTISKID TIRE CHAIN LINKS

John R. Reyburn, Fairfield, Conn., assignor to American Chain & Cable Company, Inc., Bridgeport, Conn., a corporation of New York Application December 9, 1937, Serial No. 178,871

2 Claims. (Cl. 59—35)

This invention relates to a method of constructing a tire chain link provided with antiskid caulks, projections, or reinforcements.

One of the main objects of this invention is an improved method of making a spirally twisted or curb chain link having antiskid projections on its side members and more specifically having antiskid projections flaring downwardly below the road face of the link and laterally outwardly beyond the sides of the link.

A more specific object of this invention is an improved method of forming a link from a bar or wire of suitable material which consists in bending the bar into the form of a link with the projections carried thereby extending outwardly in the plane of the link whereby such projections will be turned into road engaging position when the link is twisted spirally.

Other objects of the invention will appear from the following description taken in connection with the drawing, in which—

Fig. 1 shows a bar provided with one form of projections and from which the link may be formed;

Fig. 2 shows a flat link formed from said bar by one step of my method;

Fig. 3 shows a side view of the link shown in Fig. 2 after it has been twisted in accordance with another step of my method;

Fig. 4 shows a top view of the link shown in Fig. 3;

Fig. 5 shows an end view of the link shown in Fig. 3;

Fig. 6 shows a bar provided with a modified form of projection;

Fig. 7 shows a flat link made from the bar shown in Fig. 6;

Fig. 8 shows a twisted link made from the link shown in Fig. 7;

Fig. 9 shows a bar having a third form of projection;

Fig. 10 shows a twisted link made from the bar shown in Fig. 9;

Fig. 11 shows a fourth form of projection; and

Fig. 12 shows a twisted link made from the bar shown in Fig. 11.

In Fig. 1 I disclose a bar 15, provided with projections 16 on one side which in the final form of the link constitute antiskid lugs or caulks. The projections 16 may be formed by cutting material out of a rectangular bar of a width equal to the combined depth of the projections 16 and the reduced portion 17 of the bar. Insofar as the method described is concerned the general shape of the bar shown in Fig. 1 may be produced by swaging, heading or other operations or the projections 16 may be welded onto a bar or wire of a transverse dimension of that of the reduced portion 17. If desired the reduced portion 17 and the projections 16 may be rounded and the latter may be given any shape as will appear obvious from a description of other figures of the drawing. It is obvious that the bar or wire may be of any desired cross section and that the projections may be formed thereon or therein or secured thereto and may be of any desired shape as viewed from any angle and may have any desired arrangement with respect to the end of a blank and may be of any desired number.

The first step I employ in forming a link from the bar 15 consists in bending the bar about an axis or axes perpendicular to the plane of the bar and projections and located to the rear of the bar with respect to the projections to form a flat link with exteriorly located projections as illustrated in Fig. 2. It is obvious, of course, that while I have shown the joint in the link at one of the ends of the link, the joint may be at the side of the link or through a projection or at any other point desired. The projections may be so located with respect to the ends of the blank that in the finished link they may lie directly opposite to each other or diagonally as desired.

A series of these links may be inter-connected as they are formed into a chain after which the joints in the links may be welded as is well understood. After the chain has been formed the links are twisted spirally into the form shown in Figs. 3, 4, and 5, by means of recessed tools indicated diagrammatically in Fig. 2 which preferably engage over the ends of the link and portions at least of the adjacent projections. This twisting operation turns the projections out of the plane of the link and into the general position shown in these figures, in which they are shown as extending downwardly below the road engaging portions of the links and as diverging outwardly laterally beyond the sides of the link. In the production of ordinary curb links the amount of twist may be about 80° causing the projections to extend at angles of about 40° and 50° to the horizontal and vertical respectively. It is obvious that the relative angular relation of the projections varies with the amount of twist given to the link, the location of the projections with respect to the end of the link, and the position of the twisting tool with respect to the projections when the link is seized and twisted.

In Figs. 6, 7, and 8 I have shown a bar provided with a projection 20 of a generally triangular form with the apex cut away to produce a ground engaging surface which may be provided with teeth 21 as indicated. Fig. 7 shows a link produced by one step in my method and Fig. 8 shows the final form of the link after the link shown in Fig. 7 has been twisted spirally in accordance with another step in my method.

In Fig. 9 I have shown another form of projection 23 filleted as at 24 and having rounded ends as indicated at 25 Fig. 10. The bar is bent into a link of the form shown in Figs. 2 and 7 and the link so formed is then twisted into the final form shown in Fig. 10.

In Fig. 11 I have shown another form of projection 27 generally triangular in form with the apex rounded as indicated at 28. The final form of the link produced in accordance with my method is shown in Fig. 12, this figure corresponding to Figs. 4, 8 and 10.

In my description and illustration of the method I have elected to show a bar of substantially rectangular stock but it is to be understood that my invention is not limited to a bar of this cross sectional shape but is applicable to bars or wires of any cross sectional shape provided at one side with projections formed thereon by recessing one side of the bar or formed thereon by any suitable method or formed separately and secured thereto in any suitable manner. It is also obvious that the step in the method which consists in bending the link into the form shown in Fig. 2 is not limited to a further step of forming a twisted link.

While I have shown and described certain specific forms of projections on bars formed into links in accordance with my method, it is to be understood that this specific disclosure has been made merely for the purpose of disclosing my method and is not to be considered limitative or restrictive of the method herein claimed, and that it is my intention not only to cover the steps of the method disclosed as a series of continuous related steps but also as separate steps practiced separately as to time or place to produce either the intermediate or final link.

I claim:

1. The method of forming a curb link having diagonally arranged antiskid caulks diverging laterally relatively to the longitudinal axis of the link and located on the lower portions of its side strands, which consists in forming an elongated link having diagonally disposed projections from a bar having projections on one side by bending said bar about spaced axes located on the other side of the bar and in twisting the ends of said elongated link in opposite directions about its central longitudinal axis.

2. The method of forming a curb link provided with diagonally located caulks diverging laterally relatively to the longitudinal axis of the link, from a flat elongated link provided on its outer edge with diagonally located projections extending in the plane of the link, which consists in twisting said elongated link and projections in opposite directions about the longitudinal axis of the elongated link to bring the projections into said diverging relation.

JOHN R. REYBURN.